United States Patent
Kamimura et al.

(10) Patent No.: US 9,097,572 B2
(45) Date of Patent: Aug. 4, 2015

(54) FLOW RATE MEASURING DEVICE

(75) Inventors: Takanori Kamimura, Nara (JP);
Mitsuo Yokohata, Osaka (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 667 days.

(21) Appl. No.: 13/505,875

(22) PCT Filed: Nov. 4, 2010

(86) PCT No.: PCT/JP2010/006506
§ 371 (c)(1),
(2), (4) Date: May 3, 2012

(87) PCT Pub. No.: WO2011/055545
PCT Pub. Date: May 12, 2011

(65) Prior Publication Data
US 2012/0221260 A1    Aug. 30, 2012

(30) Foreign Application Priority Data
Nov. 4, 2009   (JP) .................................. 2009-252605

(51) Int. Cl.
*G06F 19/00*     (2011.01)
*G01F 1/00*      (2006.01)
(Continued)

(52) U.S. Cl.
CPC .............. *G01F 25/0053* (2013.01); *G01F 1/66* (2013.01); *G01F 15/0755* (2013.01)

(58) Field of Classification Search
CPC ... G01F 15/0755; G01F 15/00; G01F 15/046; G01F 1/66; G01F 25/0053
USPC ............................................. 702/45, 50, 100
See application file for complete search history.

(56) References Cited

U.S. PATENT DOCUMENTS

| 7,809,514 B2 | 10/2010 | Miyata et al. |
| 2010/0292940 A1* | 11/2010 | Iwamoto .................. 702/45 |
| 2011/0178732 A1 | 7/2011 | Iwamoto |

FOREIGN PATENT DOCUMENTS

| EP | 1 881 304 A1 | 1/2008 |
| JP | 2006-038630 A | 2/2006 |

(Continued)

OTHER PUBLICATIONS

International Search Report for International Application No. PCT/JP2010/006506, dated Jan. 25, 2011, 1 page.

(Continued)

*Primary Examiner* — John H Le
(74) *Attorney, Agent, or Firm* — Brinks Gilson & Lione

(57) ABSTRACT

A problem of the present invention is to provide a flow rate measurement device which is capable of simplifying calculation, reducing the amount of memory necessary for calculation, absorbing variations resulting from manual operation or ignition state when the appliances are used alone or in combination, and improving appliance identification precision of appliances having similar characteristics with a configuration which extracts characteristics of appliances. The flow rate measurement device identifies the appliances with high precision by extracting characteristics of gas appliances from code sequences into which a differential conversion unit converts, at regular time intervals, differentials by a first calculation unit which calculates differentials at regular time intervals in the flow rates measured by a flow rate measurement unit and by a second calculation unit which calculates differentials at time intervals different from the first calculation unit.

6 Claims, 14 Drawing Sheets

(51) Int. Cl.
*G01F 25/00* (2006.01)
*G01F 1/66* (2006.01)
*G01F 15/075* (2006.01)

(56) References Cited

FOREIGN PATENT DOCUMENTS

| JP | 2006-313114 A | 11/2006 |
| JP | 2007-178285 A | 7/2007 |
| JP | 2008-309498 A | 12/2008 |
| WO | WO 2008/152812 A1 | 12/2008 |

OTHER PUBLICATIONS

Supplementary European Search Report in corresponding European Application No. 10 82 8106, dated Jun. 28, 2013, 8 pages.

* cited by examiner

FIG.2

| ABSOLUTE FLOW RATE $Q(n)$ | DIFFERENTIAL FLOW RATE $\Delta Q$ | CODE |
|---|---|---|
| $Q(n) \neq 0$ | $400 < |Q(n)|$ | F |
| | $300 < |Q(n)| \leq 400$ | E |
| | $250 < |Q(n)| \leq 300$ | D |
| | $200 < |Q(n)| \leq 250$ | C |
| | $175 < |Q(n)| \leq 200$ | B |
| | $150 < |Q(n)| \leq 175$ | A |
| | $125 < |Q(n)| \leq 150$ | 9 |
| | $100 < |Q(n)| \leq 125$ | 8 |
| | $75 < |Q(n)| \leq 100$ | 7 |
| | $50 < |Q(n)| \leq 75$ | 6 |
| | $40 < |Q(n)| \leq 50$ | 5 |
| | $30 < |Q(n)| \leq 40$ | 4 |
| | $20 < |Q(n)| \leq 30$ | 3 |
| | $10 < |Q(n)| \leq 20$ | 2 |
| | $|Q(n)| \leq 10$ | 1 |
| $Q(n) = 0$ | FLOW RATE: ZERO | 0 |

(a)

(b)

(c)

(d)

(b)

(a)

(d)

(c)

(a)

| FLOW RATE Q(n) | DIFFERENTIAL ΔQ1 | CODE | EXTRACTED CODE |
|---|---|---|---|
| 0 | 0 | 0 | 0 |
| 106 | 106 | 8 | 8 |
| 167 | 61 | 6 | |
| 169 | 2 | 1 | 1 |
| 167 | −2 | 1 | |
| 168 | 1 | 1 | |
| 163 | −5 | 1 | |
| 142 | −21 | 3 | 3 |
| 143 | 1 | 1 | 1 |
| 143 | 0 | 0 | |
| 143 | 0 | 0 | |
| 143 | 0 | 0 | |
| 142 | −1 | 1 | |
| 142 | 0 | 0 | |
| 142 | 0 | 0 | |
| 143 | 1 | 1 | |

(b)

(c)

(d)

(a)

| FLOW RATE Q(n) | DIFFERENTIAL ΔQ1 | CODE | EXTRACTED CODE |
|---|---|---|---|
| 0 | 0 | 0 | 0 |
| 80 | 80 | 7 | 8 |
| 135 | 55 | 6 | 1 |
| 240 | 105 | 8 | 2 |
| 240 | 0 | 1 | |
| 240 | 0 | 1 | -6 |
| 270 | 30 | 3 | |
| 230 | -40 | -4 | |
| 215 | -15 | -2 | |
| 160 | -55 | -6 | 1 |
| 150 | -10 | 1 | |
| 150 | 0 | 1 | |
| 150 | 0 | 1 | |
| 150 | 0 | 1 | |
| 150 | 0 | 1 | |
| 150 | 0 | 1 | |

(b)

(c)

(d)

(b)

(a)

| FLOW RATE Q(n) | DIFFERENTIAL ΔQ1 | CODE | EXTRACTED CODE |
|---|---|---|---|
| 0 | 0 | 0 | 0 |
| 41 | 41 | 5 | 5 |
| 81 | 40 | 4 | 1 |
| 122 | 41 | 5 | |
| 162 | 40 | 4 | |
| 162 | 0 | 1 | |
| 162 | 0 | 1 | |
| 162 | 0 | 1 | |
| 162 | 0 | 1 | |
| 162 | 0 | 1 | |
| 162 | 0 | 1 | |
| 162 | 0 | 1 | |
| 162 | 0 | 1 | |
| 162 | 0 | 1 | |
| 162 | 0 | 1 | |

(d)

(c)

FLOW RATE MEASURING DEVICE

This application is a 371 application of PCT/JP2010/006506 having an international filing date of Nov. 4, 2010, which claims priority to JP2009-252605 filed Nov. 4, 2009, the entire contents of which are incorporated herein by reference.

TECHNICAL FIELD

The present invention relates to a technique for correctly identifying an appliance which uses a fluid by capturing a change in a flow rate of the fluid.

BACKGROUND ART

As a gas meter of the related art which specifies a used appliance in a fluid piping system having a gas meter, a gas meter described in Patent Literature 1 is known. The configuration will be described with reference to FIG. 13.

As shown in FIG. 13, a gas meter 1 is disposed in a flow channel 6 connected to a household gas supply line. The gas meter 1 has flow rate measurement unit 3 for measuring a gas flow rate at a regular time interval, calculation unit 4 for calculating a differential in the flow rates output from the flow rate measurement unit 3, and comparison/determination unit 7 for comparing in magnitude the differential calculated by the calculation unit 4 with a change determination value registered in storage unit 5 and determining a change in the state of usage of the gas appliance. The calculation unit 4, the comparison/determination unit 7, and a gas shutoff valve 2 are controlled by a control circuit 116.

In the gas meter 1, the change in the differential of the instantaneous flow rate output from the flow rate measurement unit 3 is sequentially calculated, and the change in the state of usage of the gas appliance is determined on the basis of the amount of change. Registered data and the measured change (differential) in the gas flow rate are compared, thereby enabling identification of used gas appliances 13, 14, and 15.

As a method of identifying the used appliance of the fluid in the related art, a method described in Patent Literature 2 is known. The configuration will be described with reference to FIG. 14.

As shown in FIG. 14, a first calculation unit 108 calculates the differentials of the gas flow rate measured by flow rate measurement unit 104 at regular intervals, and a differential conversion unit 112 classifies the differentials at regular time intervals into predetermined classifications using a flow rate classification table 110a stored in flow rate classification table holding unit 110, and converts the differentials to predetermined codes representing the classifications. An appliance identification unit 116 compares a code sequence generated by code sequence generation unit 114 using the codes converted by the differential conversion unit 112 with appliance-specific characteristic code sequences specific to the appliances stored in an appliance-specific code sequence information holding unit 118, and identifies the appliances.

In the above configuration, a code value obtained by encoding (converting) the differential of the flow rate is used, and at the time of appliance identification, calculation is simplified, thereby reducing the amount of memory or the like necessary for calculation and achieving improvement in calculation speed and appliance identification precision.

CITATION LIST

Patent Literature

Patent Literature 1: JP-A-2006-313114
Patent Literature 2: JP-A-2008-309498

SUMMARY OF THE INVENTION

Technical Problem

However, with the configuration of the related art, for example, in a hot plate or the like which causes ignition by a pilot burner, when a user confirms a flame and releases his/her hand from a knob, the flow rate decreases. Meanwhile, the time until the hand is released varies, or the gentle ignition time of a fan heater or the like varies depending on the ignition state. For this reason, in the flow rate differential or the code sequence, erroneous determination may be made at the time of comparison with data registered in advance, and it may be difficult to clearly recognize characteristics depending on the measurement timing in appliances having similar characteristics.

The invention solves the problems of the related art, and an object of the invention is to simplify calculation, to reduce the amount of memory necessary for calculation, to absorb variations resulting from manual operation or ignition state when appliances are used alone or in combination, and to improve appliance identification precision with a configuration which extracts characteristics of appliances.

Solution to Problem

In order to solve the problems of the related art, a flow rate measurement device according to an aspect of the invention is configured to include a flow rate measurement unit that is configured to measure a flow rate of a fluid flowing in a flow channel at a regular time interval; a first calculation unit that is configured to calculate differentials at regular time intervals in the flow rates measured by the flow rate measurement unit; a second calculation unit that is configured to calculate differentials at time intervals different from those in the first calculation unit; a flow rate classification table in which a plurality of differential classifications classified according to the magnitude of the differentials are associated with codes representing the respective classifications; a differential conversion unit that is configured to convert the differentials calculated by the first calculation unit and the second calculation unit on the basis of the flow rate classification table; an appliance characteristic extraction unit that is configured to generate an appliance characteristic code sequence representing characteristics of an appliance from codes obtained at regular time intervals by the differential conversion unit or extract a plurality of appliance characteristic flow rates representing characteristics of the appliance from the flow rate measured by the flow rate measurement unit; and an appliance identification unit that is configured to compare at least either the appliance characteristic code sequence extracted by the appliance characteristic extraction unit with appliance-specific characteristic code sequences specific to the appliances held in an appliance-specific characteristic information holding unit or a plurality of appliance characteristic flow rates extracted by the appliance characteristic extraction unit with a plurality of appliance-specific characteristic flow rates specific to the appliances held in the appliance-specific characteristic information holding unit so as to identity the appliance, wherein the appliance characteristic extraction unit monitors and determines the change in the flow rate measured by the flow rate measurement unit, or monitors and determines the codes obtained by the differential conversion unit to extract the appliance characteristic flow rates representing the characteristic of the appliance.

Therefore, it is possible to extract the flow rates representing the characteristics of the appliances as well as the degree of increase/decrease in the flow rate, that is, the characteristics of the appliances with an increase or decrease in the codes, to absorb variations resulting from manual operation or ignition state, and to identify appliances having similar characteristics.

Advantageous Effects of Invention

According to the flow rate measurement device of the invention, it is possible to simplify calculation, to reduce the amount of memory necessary for calculation, to absorb variations resulting from manual operation or ignition state, and to improve identification precision of appliances having similar characteristics with a configuration which extracts the characteristics of the appliances.

BRIEF DESCRIPTION OF DRAWINGS

FIG. 2 is a diagram showing an example of a flow rate classification table in Embodiments 1 to 3 of the invention.

DESCRIPTION OF EMBODIMENTS

Figure 1:
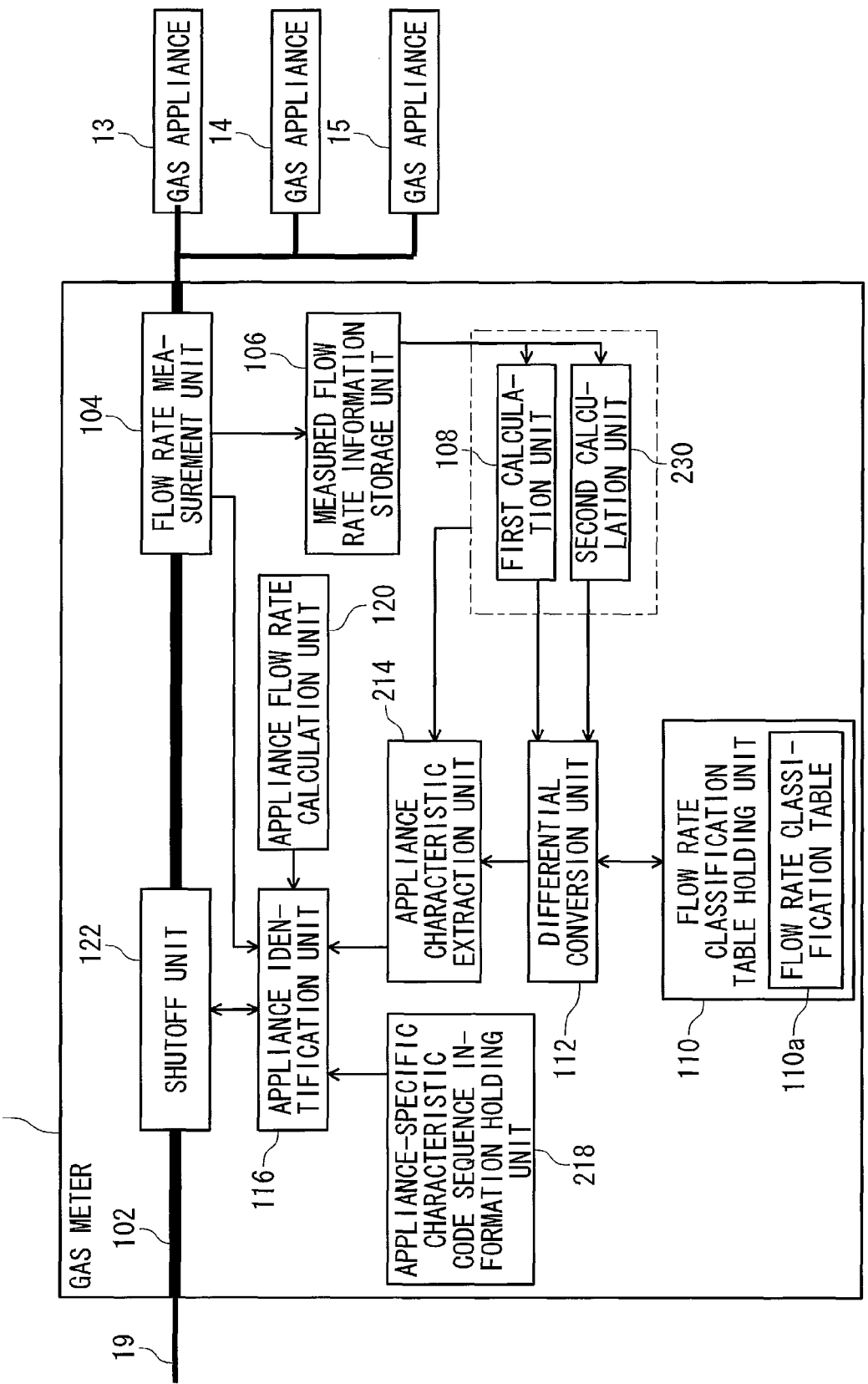
FIG. 1 is a block diagram of a flow rate measurement device in Embodiments 1 to 3 of the invention.

A first aspect of the invention is configured to include: a flow rate measurement unit that is configured to measure a flow rate of a fluid flowing in a flow channel at a regular time interval; a first calculation unit that is configured to calculate differentials at regular time intervals in the flow rates measured by the flow rate measurement unit; a second calculation unit that is configured to calculate differentials at time intervals different from those in the first calculation unit; a flow rate classification table in which a plurality of differential classifications classified according to the magnitude of the differentials are associated with codes representing the respective classifications; a differential conversion unit that is configured to convert the differentials calculated by the first calculation unit and the second calculation unit on the basis of the flow rate classification table; an appliance characteristic extraction unit that is configured to generate an appliance characteristic code sequence representing characteristics of an appliance from codes obtained at regular time intervals by the differential conversion unit or extract a plurality of appliance characteristic flow rates representing characteristics of the appliance from the flow rate measured by the flow rate measurement unit; and an appliance identification unit that is configured to compare at least either the appliance characteristic code sequence extracted by the appliance characteristic extraction unit with appliance-specific characteristic code sequences specific to the appliances held in an appliance-specific characteristic information holding unit or a plurality of appliance characteristic flow rates extracted by the appliance characteristic extraction unit with a plurality of appliance-specific characteristic flow rates specific to the appliances held in the appliance-specific characteristic information holding unit so as to identity the appliance.

Therefore, it becomes possible to extract flow rates representing characteristics when the appliances are in operation and flow rates representing characteristics in a stable state, and to extract the stable characteristics of the appliances.

A second aspect of the invention is configured so that, in the first aspect of the invention, the appliance characteristic extraction unit adds a minus sign to a code when a differential calculated by the first calculation unit or the second calculation unit is negative and the code obtained by the differential conversion unit is other than a predetermined code, and does not overwrite a current code on a last code stored in the appliance characteristic code sequence when the last code is positive and the current code is negative.

Therefore, it is possible to add increase/decrease information to the characteristics of the appliances depending on the increase or decrease in the codes, and to perform identification depending on the increase/decrease even if the same code is used.

A third aspect of the invention is configured so that, in the first aspect of the invention, when the change in the codes obtained by the differential conversion unit has an N shape, that is, when a second last code is greater than a third last code, a last code is smaller than the second last code, and a current code is greater than the last code, if the differential between the last code and the second last code is equal to or smaller than a predetermined value, and the second last code is smaller than the current code, or when the change in the codes obtained by the differential conversion unit has an inverted N shape, that is, when the second last code is smaller than the third last code, the last code is greater than the second last code, and the current code is smaller than the last code, if the differential between the last code and the second last code is equal to or smaller than a predetermined value, and the second last code is greater than the current code, the appliance characteristic extraction unit deletes the last code and the second last code stored in the appliance characteristic code sequence, and overwrites the current code on the second last code stored in the appliance characteristic code sequence, thereby compressing the appliance characteristic code sequence.

Therefore, it is possible to extract the degree of increase or decrease in the flow rate, that is, the characteristics of the appliances with an increase or a decrease in the codes, to absorb variations, and to extract the stable characteristics of the appliances.

A fourth aspect of the invention is configured so that, when the change in the codes obtained by the differential conversion unit has an M shape, that is, when a third last code is greater than a fourth last code, a second last code is smaller than the third last code, a last code is greater than the second last code, and a current code is smaller than the last code, if the differential between the last code and the second last code is equal to or smaller than a predetermined value, and the second last code and the current code are the same, or when the change in the codes obtained by the differential conversion unit has a W shape, that is, when the third last code is smaller than the fourth last code, the second last code is greater than the third last code, the last code is smaller than the second last code, and the current code is greater than the last code, if the differential between the last code and the second last code is equal to or smaller than a predetermined value, and the second last code and the current code are the same, the appliance characteristic extraction unit deletes the last code and the second last code stored in the appliance characteristic code sequence, and overwrites the current code on the second last code stored in the appliance characteristic code sequence, thereby compressing the appliance characteristic code sequence.

Therefore, it is possible to extract the degree of increase or decrease in the flow rate, that is, the characteristics of the appliances with an increase or a decrease in the codes, to absorb variations, and to extract the stable characteristics of the appliances.

A fifth aspect of the invention is configured so that, in the first aspect of the invention, when the absolute value of the final code of the appliance characteristic code sequence is equal to or greater than a predetermined value, the appliance characteristic extraction unit deletes the final code from the appliance characteristic code sequence.

Therefore, it becomes possible to exclude codes, which appear when artificial switching of the amount of combustion is performed, from the appliance characteristic code sequence, and to stably extract the characteristics of the appliances.

A sixth aspect of the invention is a program which causes a computer to function as a whole or a part of the flow rate measurement device as set forth in any one of the first to fifth aspects of the invention. With this program, at least a portion of the program of the invention can be easily realized using a general-use computer or a server. The program may be recorded on a recording medium or may be distributed using a communication line, thereby simplifying program distribution or installation.

Since the object of the invention can be attained by making the main parts of the first to fifth aspects of the invention conform to the embodiments, the details of the embodiments corresponding to the respective claims will be described below with reference to the drawings, and the best mode for carrying out the invention will be described. However, the invention is not limited to the embodiments. In the description of the respective embodiments, the parts having the same configuration and the same functional effects are represented by the same reference numerals, and overlapping description will be omitted.

Embodiment 1

FIG. 1 is a block diagram of a flow rate measurement device in Embodiment 1 of the invention.

In FIG. 1, a gas meter 100 includes a flow channel 102, a flow rate measurement unit 104, a measured flow rate information storage unit 106, a first calculation unit 108, a second calculation unit 230, a flow rate classification table holding unit 110, a differential conversion unit 112, an appliance characteristic extraction unit 214, appliance identification unit 116, and an appliance-specific characteristic code sequence information holding unit 218. The gas meter 100 is disposed in the flow channel 102, and includes a shutoff unit 122 which shuts off gas in emergency or the like.

An ultrasonic flowmeter serving as the flow rate measurement unit 104 emits ultrasonic waves with respect to gas as a fluid flowing in the flow channel 102 at regular time intervals to measure the gas flow rate, and a general ultrasonic flowmeter may be used. The measured flow rate information storage unit 106 stores target data in which a measured flow rate measured by the flow rate measurement unit 104 is described in association with the measurement time at which the measured flow rate is measured.

The first calculation unit 108 calculates differentials in the gas flow rate measured by the flow rate measurement unit 104 at regular time intervals corresponding to the above-described ultrasonic wave emission interval. For example, in FIG. 3(a) described below, when a flow rate (absolute flow rate) at a predetermined timing is 90 L/h (liters per hour), and a flow rate at the next timing is 145 L/h, the differential at this time is calculated to be 145−90=55 (L/h). The large flow rate classification table holding unit 110 holds a flow rate classification table 110a shown in FIG. 2 in which a plurality of differential classifications classified according to the magnitude of the differentials are associated with codes representing the respective classifications. The flow rate classification table 110a serves as a conversion table which classifies the absolute values of the measured differentials into predetermined classifications and converts the differentials to predetermined codes representing the classifications. The number of classifications of the flow rate classification table 110a is not particularly limited, and in FIG. 2, for example, the differentials are classified into 16 codes. Although a region where it is determined that the flow rate is zero is described, there are few cases where the flow rate measured in the actual device is completely zero because of a few variations. Accordingly, the condition that the flow rate is zero includes when the flow rate is approximately zero, substantially zero.

The second calculation unit 230 calculates differentials in the gas flow rate measured by the flow rate measurement unit 104 at time intervals different from those in the first calculation unit 108 which performs calculation at regular time intervals corresponding to the ultrasonic wave emission interval (if the first calculation unit calculates the differential between the last flow rate and the current flow rate, the second calculation unit 230 may calculate the differential between the second last flow rate and the current flow rate or the differential between the third last flow rate and the current flow rate). For example, in FIG. 3(a) described below, when a flow rate (absolute flow rate) at a predetermined timing increases from 0 L/h (liters per hour) to 90 L/h (liters per hour), and a flow rate at the next timing is 145 L/h, the differential of the first calculation unit 108 at this time is calculated as 145−90=55 (L/h), and the differential of the second calculation unit 230 is calculated as 145−0=145 (L/h). The large flow rate classification table holding unit 110 holds a flow rate classification table 110a shown in FIG. 2 in which a plurality of differential classifications according to the magnitude of the differentials are associated with codes representing the classifications. The flow rate classification table 110a serves as a conversion table which classifies the absolute values of the measured differentials into predetermined classifications and converts the differentials to predetermined codes representing the classifications. The number of classifications of the flow rate classification table 110a is not particularly limited, and in FIG. 2, for example, the differentials are classified into 16 codes.

The ranges of the classifications are fragmented with different flow rate intervals. For example, the ranges of the classifications are fragmented with an increasing differential in the flow rate such that the codes 1 to 5 are 10 L/h, the codes 6 to B are 25 L/h, the codes C to D are 50 L/h, and the code E is 100 L/h. With this configuration, since there are many kinds of appliances in a region where the differential is small, the interval decreases, thereby increasing identification precision.

The codes A to F express 10 to 15 in hexadecimal, and magnitude comparison can be performed with the codes as numerical values.

The differential conversion unit 112 converts the differentials calculated by the first calculation unit 108 and the second calculation unit 230 to the codes representing the respective classifications, into which the differentials at regular time interval (of ultrasonic wave emission) are classified, on the basis of the flow rate classification table 110a.

The appliance characteristic extraction unit 214 generates an extracted code sequence representing the characteristics of the appliances from a measured code sequence obtained by actual measurement on the basis of a set of codes at regular time intervals obtained by the differential conversion unit 112. The measured code sequence expresses the change in the flow rate of the fluid in a pseudo manner. The appliance characteristic extraction unit 214 records the extracted code sequence representing the characteristics of the appliances in a memory (not shown) as necessary. The appliance characteristic extraction unit 214 monitors the gas flow rate measured by the flow rate measurement unit 104, extracts a plurality of appliance characteristic flow rates including, for example, the gentle ignition flow rate of the fan heater representing the characteristics of the appliances from the change in the flow rate, and stores the plurality of appliance characteristic flow rates in the memory (not shown) as necessary.

The appliance identification unit 116 identifies a gas appliance using gas as a fluid on the basis of the extracted code sequence extracted by the appliance characteristic extraction unit 214 and the appliance characteristic flow rate. The appliance identification unit 116 compares the extracted code sequence with appliance-specific characteristic code sequences representing characteristic code sequences specific to the appliances stored in the appliance-specific characteristic code sequence information holding unit 218 in advance for the gas appliances or a plurality of appliance characteristic flow rates, and identifies a gas appliance using gas from a similarity relation or the like.

The appliance flow rate calculation unit 120 may calculate the flow rate of each gas appliance identified by the appliance identification unit 116. The gas meter 100 is connected to a gas duct 19 on the upstream side, and is also connected to various gas appliances 13, 14, and 15, such as a hot plate, a fan heater, and floor heating, on the downstream side.

With regards to the flow rate measurement device configured as above, the operation of an appliance characteristic extraction process will be hereinafter described.

First, a flow rate (absolute flow rate) Q(n) measured by the flow rate measurement unit 104 at a regular time interval (for example, 0.5 seconds or the like) and a previously measured flow rate Q(n−1) are temporarily stored in the measured flow rate information storage unit 106. Thereafter, a differential $\Delta Q1(n)=Q(n)-Q(n-1)$ which is the difference between Q(n) and the previously measured flow rate Q(n−1) is calculated by the first calculation unit 108, and a differential $\Delta Q2(n)=Q(n)-Q(n-2)$ is calculated by the second calculation unit 230. The regular time interval may be 1 second or 2 seconds. ΔQ1 may be the difference from the second last flow rate, and ΔQ2 may be the difference from the third last flow rate.

The differential conversion unit 112 converts the absolute values of the differential ΔQ1(n) calculated by the first calculation unit 108 and the differential ΔQ2(n) calculated by the second calculation unit 230 to classification codes, which are codes representing the classifications for classifying the differentials at regular time intervals, with reference to the flow rate classification table 110a of FIG. 2. FIGS. 3(a) to 3(d) show an example of conversion using the flow rate classification table. If a gas appliance A (for example, a fan heater) corresponding to one of the gas appliances 13, 14, and 15 of FIG. 1 starts to be activated and a gas flow rate is generated, as shown in "FLOW RATE" of FIG. 3(a) and a graph of FIG. 3(b), the flow rate to be measured is changed from the flow rate Q(n)=0 to the flow rate Q(n)≠0, and the flow rate changes in accordance with gas usage. Simultaneously with measurement of the flow rate by the flow rate measurement unit 104, the first calculation unit 108 calculates a differential and the differential conversion unit 112 converts the differential to a classification code (shown in a "CODE" sequence of FIG. 3(a)).

The appliance characteristic extraction unit 214 generates an extracted code sequence representing the characteristics of the appliances from a measured code sequence obtained by actual measurement on the basis of a set of codes at regular time intervals obtained by the differential conversion unit 112. The measured code sequence expresses the change in the flow rate of the fluid in a pseudo manner. The appliance characteristic extraction unit 214 records the extracted code sequence representing the characteristics of the appliances in a memory (not shown) as necessary.

The appliance identification unit 116 identifies a gas appliance using gas as a fluid on the basis of the extracted code sequence extracted by the appliance characteristic extraction unit 214. The appliance identification unit 116 compares the extracted code sequence with appliance-specific characteristic code sequences representing characteristic code sequences specific to the appliances stored in the appliance-specific characteristic code sequence information holding unit 218 in advance for the gas appliances, and identifies a gas appliance using gas from a similarity relation or the like.

The appliance flow rate calculation unit 120 may calculate the flow rate of each gas appliance identified by the appliance identification unit 116. The gas meter 100 is connected to a gas duct 19 on the upstream side, and is also connected to various gas appliances 13, 14, and 15, such as a hot plate, a fan heater, and floor heating, on the downstream side.

With regards to the flow rate measurement device configured as above, the operation of an appliance characteristic extraction process will be hereinafter described.

First, a flow rate (absolute flow rate) Q(n) measured by the flow rate measurement unit 104 at a regular time interval (for example, 0.5 seconds or the like) and a previously measured flow rate Q(n−1) are temporarily stored in the measured flow rate information storage unit 106. Thereafter, a differential ΔQ1(n)=Q(n)−Q(n−1) which is the difference between Q(n) and the previously measured flow rate Q(n−1) is calculated by the first calculation unit 108. The regular time interval may be 1 second or 2 seconds.

The differential conversion unit 112 converts the absolute value of the differential ΔQ1(n) calculated by the first calculation unit 108 to a classification code, which is a code representing each of the classifications for classifying the differentials at regular time intervals, with reference to the flow rate classification table 110a of FIG. 2. FIGS. 3(a) to 3(d) show an example of conversion using the flow rate classification table. If a gas appliance A (for example, a fan heater) corresponding to one of the gas appliances 13, 14, and 15 of FIG. 1 starts to be activated and a gas flow rate is generated, as shown in "FLOW RATE" of FIG. 3(a) and a graph of FIG. 3(b), the flow rate to be measured changes from the flow rate Q(n)=0 to the flow rate Q(n)≠0, and the flow rate changes depending on the used amount of gas. Simultaneously with measurement of the flow rate by the flow rate measurement unit 104, the first calculation unit 108 calculates a differential, and the differential conversion unit 112 converts the differential to a classification code.

Figure 3:
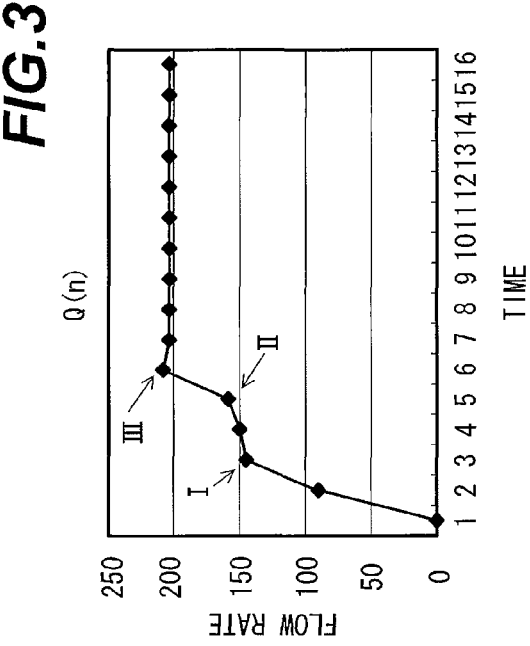
In FIG. 3, (a) is a diagram showing a concept of classifying flow rate differentials when using a gas appliance A in accordance with a flow rate classification table in Embodiment 1 of the invention, (b) is a graph showing flow rate characteristics when using the gas appliance A, (c) is a graph showing codes classified when using the gas appliance A, and (d) is a graph showing a code sequence with characteristics extracted when using the gas appliance A.
Figure 3:
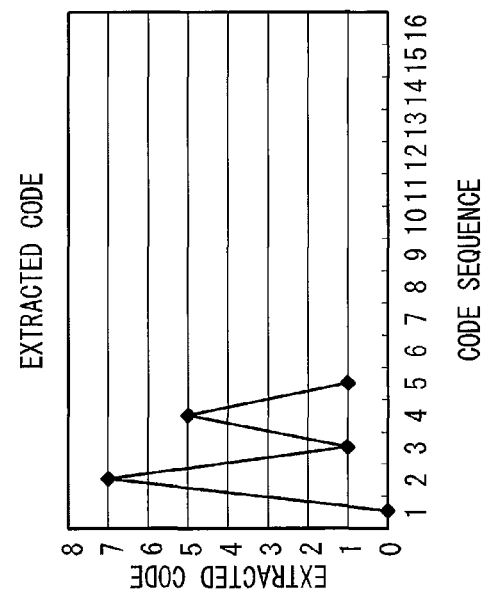
Figure 3:
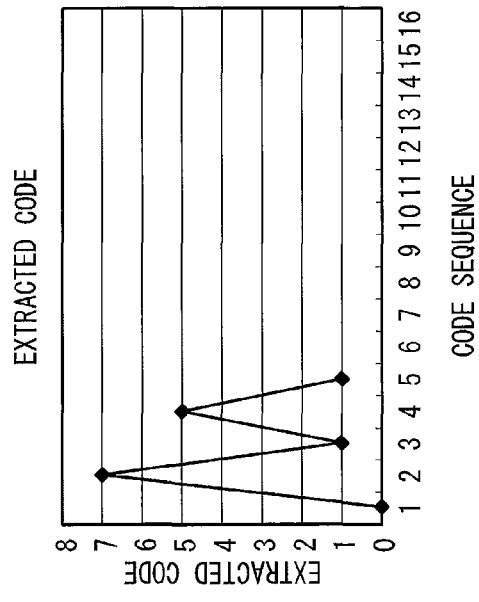
Figure 3:
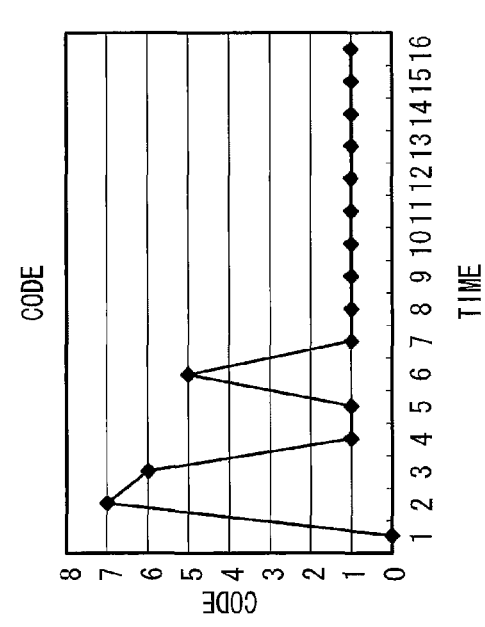

Among the code obtained as the result of the conversion, that is, the codes converted by the differential conversion unit 112, when the last code is greater than the second last code and the last code is greater than the current code, or when the last code is smaller than the second last code and the last code is smaller than the current code, the appliance characteristic extraction unit 214 performs a process for storing the current code in the appliance characteristic code sequence serving as a memory (not shown), and in other cases, for overwriting the current code on the last code stored in the appliance characteristic code sequence. With this process, a code sequence extracted from a code sequence [0761151111111111] at regular time intervals shown in FIG. 3(a) is stored in the appliance characteristic code sequence. That is, with this process, it is possible to extract the peak value of the codes from the activation of the gas appliance A to the change point I, from the change point I to the change point II, and the change point II to the change point III shown in FIG. 3(b). The extracted code sequence is shown in the graph of FIG. 3(d). From this graph, it is understood that, although the amount of information is compressed, the characteristics of the appliances are extracted sufficiently compared to the graph of the code sequence before extraction shown in FIG. 3(c).

Similarly, FIGS. 4(a) to 4(d) are diagrams showing a concept of characteristic extraction when using a gas appliance B. In a gas appliance B (for example, a push lever-type hot plate or the like), a code sequence [061] extracted from a code sequence [0361111111111111] at regular time intervals converted by the differential conversion unit 112 is stored in the appliance characteristic code sequence.

Figure 4:
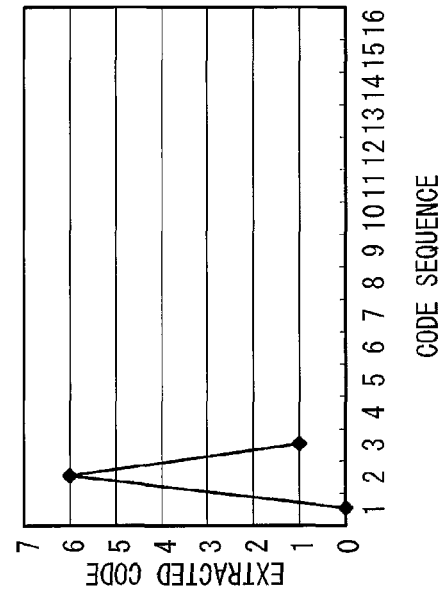
In FIG. 4, (a) is a diagram showing a concept of classifying flow rate differentials when using a gas appliance B in accordance with a flow rate classification table in Embodiment 1 of the invention, (b) is a graph showing flow rate characteristics when using the gas appliance B, (c) is a graph showing codes classified when using the gas appliance B, and (d) is a graph showing a code sequence with characteristics extracted when using the gas appliance B.
Figure 4:
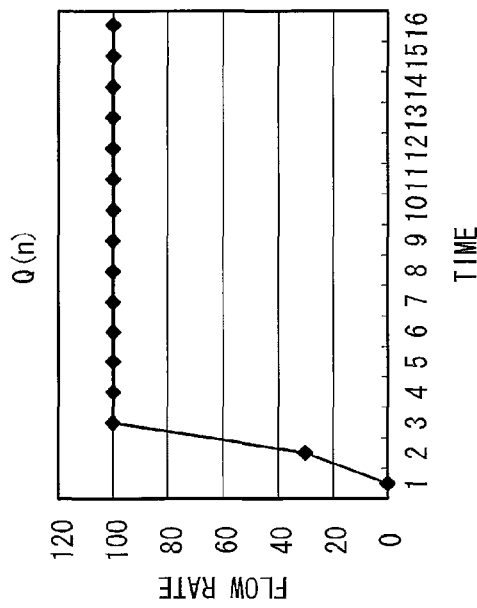
Figure 4:
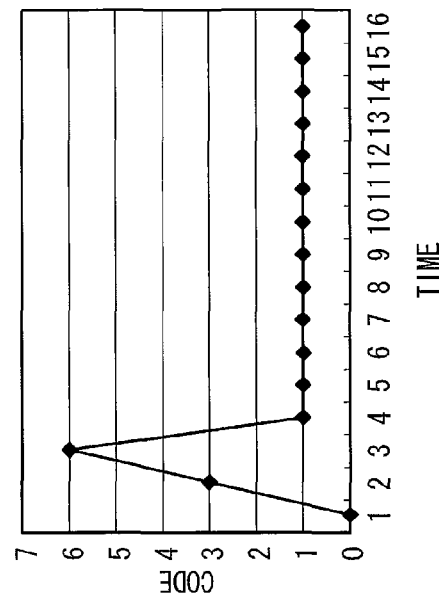

When the extracted appliance characteristic code sequence in the gas appliance A is compared with that in the gas appliance B, two peaks appear in the gas appliance A, that is, in the graph of FIG. 3(d), but only one peak appear in the gas appliance B, that is, in the graph of FIG. 4(d). This is because the gentle ignition operation is performed in the appliance A, making it possible to clearly identify the gas appliance A from the gas appliance B.

The characteristic code sequence specific to each gas appliance which is the rise characteristic of each gas appliance is stored in the appliance-specific characteristic code sequence information holding unit 218 in advance. If the obtained appliance characteristic code sequence is [07151], it is possible to determine that the used gas appliance is the gas appliance A. If the obtained appliance characteristic code sequence is [061], it is possible to determine that the used gas appliance is the gas appliance B.

Next, FIGS. 5(a) to 5(f) and FIGS. 6(a) to 6(f) are diagrams showing a concept when a gas appliance C and a gas appliance D which are different kinds of gas fan heaters are used. In the gas appliance C, a code sequence at regular time intervals converted by the differential conversion unit 112 becomes [0761151111111111] in the example of FIG. 5(a) and becomes [07151] by the characteristic extraction process. In the gas appliance D, a code sequence becomes

Figure 5:
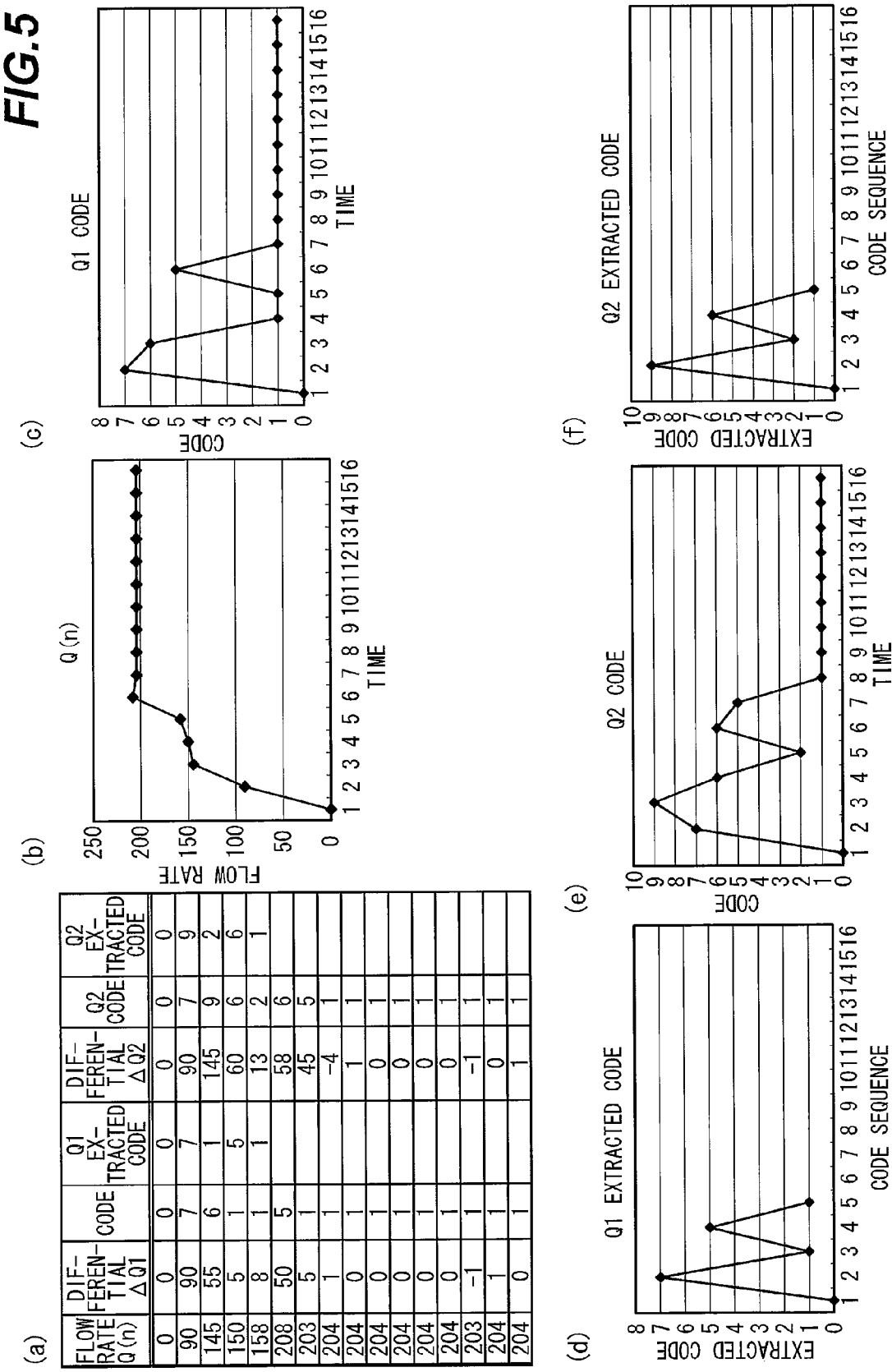
In FIG. 5, (a) is a diagram showing a concept of classifying flow rate differentials when using a gas appliance C in accordance with a flow rate classification table in Embodiment 1 of the invention, (b) is a graph showing flow rate characteristics when using the gas appliance C, (c) is a graph showing a Q1 code classified when using the gas appliance C, (d) is a graph showing a Q1 code sequence with characteristics extracted when using the gas appliance C, (e) is a graph showing a Q2 code classified when using the gas appliance C, and (f) is a graph showing a Q2 code sequence with characteristics extracted when using the gas appliance C.
Figure 6:
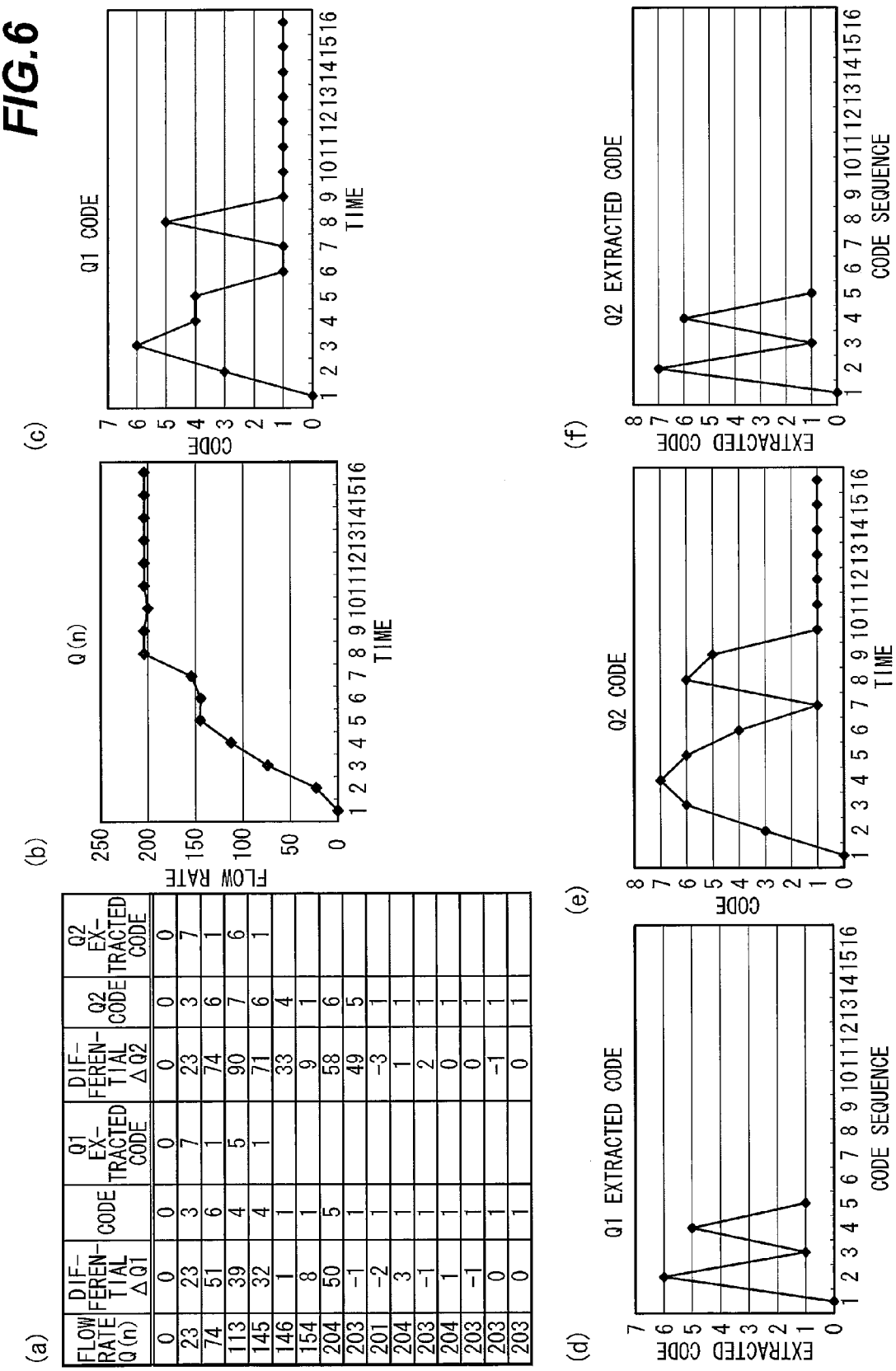
In FIG. 6, (a) is a diagram showing a concept of classifying flow rate differentials when using a gas appliance D in accordance with a flow rate classification table in Embodiment 1 of the invention, (b) is a graph showing flow rate characteristics when using the gas appliance C, 6(c) is a graph showing a Q1 code classified when using the gas appliance C, (d) is a graph showing a Q1 code sequence with characteristics extracted when using the gas appliance C, (e) is a graph showing a Q2 code classified when using the gas appliance C, and (f) is a graph showing a Q2 code sequence with characteristics extracted when using the gas appliance C.

[0364411511111111] in the example of FIG. 6(a) and becomes [06151] by the characteristic extraction process. In this case, although the gas appliances are different, the difference between [7] and [6] of the second digit is only 1, and if the code different of ±1 for erroneous determination prevention described below is allowed, there is no clear difference. Thus, it is determined that the appliances are the same gas appliance. However, in Embodiment 1, the code sequence of the differential of the second last value and the current value by the second calculation unit becomes [0796265111111111] in the example of FIG. 5(a) and becomes [09261] by the characteristic extraction process. The code sequence becomes [0367641651111111] in the example of FIG. 6(a) and becomes [07161] by the characteristic extraction process. In this case, the difference is 2, and even when the code difference of ±1 for erroneous determination prevention is allowed, different code sequences are obtained. Thus, it can be predetermined that the appliances are different gas appliances.

As described above, in this embodiment, the appliance characteristics are extracted from the code sequence at regular time intervals converted by the differential conversion unit 112 from the differentials calculated by the second calculation unit 230 at time intervals different from the first calculation unit 108. Therefore, it is possible to perform appliance identification with high precision using the two codes calculated by the first calculation unit 108 and the codes calculated by the second calculation unit 230, and to compress the code sequence by characteristic extraction, thereby reducing the memory size.

Embodiment 2

FIGS. 8(a) to 8(d) are diagrams showing a concept of characteristic extraction in Embodiment 2 of the invention. As described in Embodiment 1, the appliances can be identified by the appliance characteristic code sequence extracted by the appliance characteristic extraction unit 214. Meanwhile, when the same gas appliance is repeatedly used, if the flow rate differential becomes close to the threshold value of the code classification due to variations in the flow rate, there is a possibility that the appliance characteristic code sequence may be different. For this reason, when the appliance-specific characteristic code sequence stored in advance in the appliance-specific characteristic code sequence information holding unit 218 is compared with the extracted appliance characteristic code sequence, the respective codes of the appliance-specific characteristic code sequence are allowed to vary up to ±1, and it is assumed that the appliances are the same, thereby preventing erroneous identification.

When the graph of FIG. 3(d) indicating the appliance characteristic code sequence of the gas appliance A is compared with the graph of FIG. 5(d) indicating the appliance characteristic code sequence of the gas appliance C, if the respective codes of the appliance-specific characteristic code sequence are allowed to vary up to ±1, and the code of the second peak is 4, there is a possibility of erroneous identification. However, as described above, with the additional use of the stable flow rate for identification, it is possible to prevent erroneous identification.

Accordingly, in addition to the characteristic extraction process described in Embodiment 1, the appliance characteristic extraction unit 214 performs a process for adding a minus sign to codes when the differential calculated by the first calculation unit 108 or the second calculation unit 230 is negative and the code obtained by the differential conversion unit 112 is other than a predetermined code, and for not overwriting the current code on the last code stored in the appliance characteristic code sequence when the last code is positive and the current code is negative. It is assumed that the predetermined code is [1].

Figure 8:
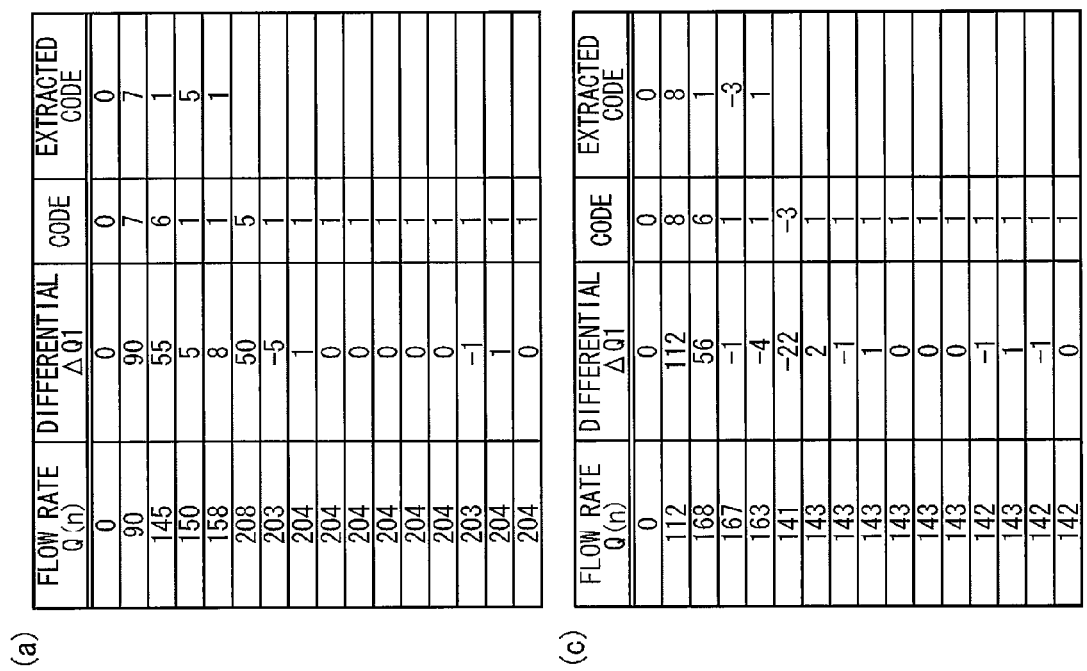
In FIG. 8, (a) is a diagram showing a concept of classifying flow rate differentials when using a gas appliance A in accordance with a flow rate classification table in Embodiment 2 of the invention, (b) is a graph showing a code sequence with characteristics extracted when using the gas appliance A, (c) is a diagram showing a concept of classifying flow rate differentials when using a gas appliance B in accordance with a flow rate classification table in Embodiment 1 of the invention, and (d) is a graph showing a code sequence with characteristics extracted when using the gas appliance B.

With this process, in the gas appliance A, as shown in FIG. 8(a), a code sequence [0761151111111111] at regular time intervals converted by the differential conversion unit 112 becomes [0761151111111111], and a code sequence [07151] extracted from [0761151111111111] is stored in the appliance characteristic code sequence.

Similarly, in the gas appliance B, as shown in FIG. 8(c), a code sequence [0861111311111111] at regular time intervals converted by the differential conversion unit 112 becomes [0861111-311111111], and a code sequence [081-31] extracted from [0861111-311111111] is stored in the appliance characteristic code sequence. Therefore, the gas appliance A and the gas appliance C can be identified clearly.

As described above, in this embodiment, the appliance characteristics including increase/decrease information of the flow rate are extracted by the appliance characteristic extraction unit 214 from the code sequence at regular time intervals converted by the differential conversion unit 112 on the basis of the differentials of the first calculation unit 108 or the second calculation unit 230. Therefore, it is possible to perform appliance identification with high precision, and to compress the code sequence by characteristic extraction, thereby reducing the memory size.

Embodiment 3

Figure 9:
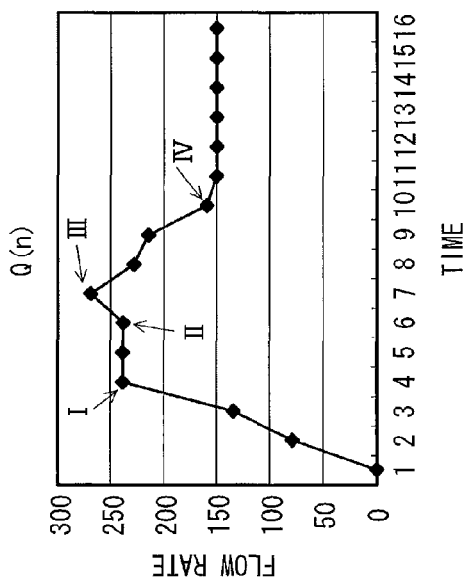
In FIG. 9, (a) is a diagram showing a concept of classifying flow rate differentials when using a gas appliance D in accordance with a flow rate classification table in Embodiment 3 of the invention, (b) is a graph showing flow rate characteristics when using the gas appliance D, (c) is a graph showing codes classified when using the gas appliance D, and (d) is a graph showing a code sequence with characteristics extracted when using the gas appliance D.
Figure 9:
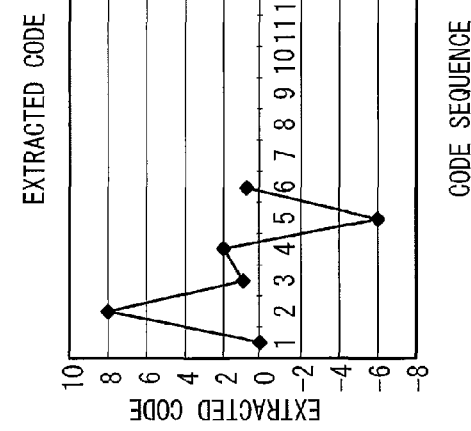
Figure 9:
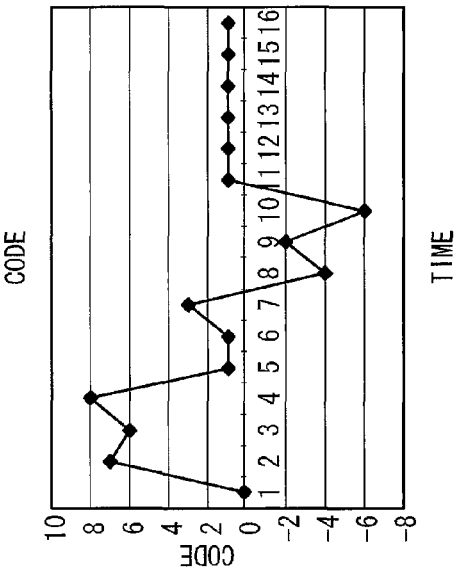

FIGS. 9(a) to 9(d) are diagrams showing a concept of characteristic extraction in Embodiment 3 of the invention. In a gas appliance D having the rise characteristic of the flow rate shown in FIG. 9(b), a code sequence at regular time intervals converted by the differential conversion unit 112 becomes [0768113-4-2-6111111] as shown in FIG. 9(a). This is shown in the graph of FIG. 9(c).

When the change from the rise in the flow rate to the change point I shown in FIG. 9(b) is observed, it is understood that, although there are differences in the inclination of the flow rate characteristic, the change has a rightward rise inclination as a whole. Similarly, when the change from the change point III to the change point IV of FIG. 9(b) is observed, it is understood that, although there are differences in the inclination of the flow rate characteristics, the change as a rightward fall inclination as a whole.

However, the code sequence in the zone corresponding to the range from the rise in the flow rate to the change point I shown in FIG. 9(b) is
and has an N-shaped characteristic as shown in FIG. 9(c). The code sequence in the zone corresponding to the range from the change point III to the change point IV of FIG. 9(b) is [3-4-2-6] and has an inverted N-shaped characteristic as shown in FIG. 9(c).

That is, although there is generally a rightward rise or a rightward fall in the flow rate characteristic, the code sequence has the N shape or the inverted N shape, and thus it may not be said that there is coincidence in the characteristic.

Accordingly, in addition to the characteristic extraction process described in Embodiment 1 or Embodiment 2, when the change in the codes obtained by the differential conversion unit 112 has an N shape, that is, when the second last code is greater than the third last code, the last code is smaller than the second last code, and the current code is greater than the last code, or when the change in the codes obtained by the differential conversion unit 112 has an inverted N shape, that is, when the second last code is smaller than the third last code, the last code is greater than the second last code, and the current code is smaller than the last code, if the differential between the last code and the second last code is equal to or smaller than a predetermined value, the appliance characteristic extraction unit 214 performs a process for deleting the last code and the second last code. It is assumed that the differential between the last code and the second last code when the change in the codes has an inverted N shape and the last code and the second last code are deleted is equal to or smaller than, for example, 2.

With this process, a code sequence [0812-61] extracted from a code sequence [0768113-4-2-6111111] at regular time intervals converted by the differential conversion unit 112 is stored in the appliance characteristic code sequence. Therefore, the N shape or the inverted N shape of the code sequence is absorbed, thereby clearly extracting the characteristic of a rightward rise or a rightward fall of the intrinsic flow rate characteristic.

As described above, in this embodiment, the appliance characteristics, in which the inclination tendency of the flow rate characteristic is reflected, are extracted by the appliance characteristic extraction unit 214 from the code sequence at regular time intervals converted by the differential conversion unit 112 on the basis of the differentials of the first calculation unit 108 or the second calculation unit 230. Therefore, it becomes possible to perform appliance identification with high precision, and to compress the code sequence by characteristic extraction, thereby reducing the memory size.

Embodiment 4

Figure 10:
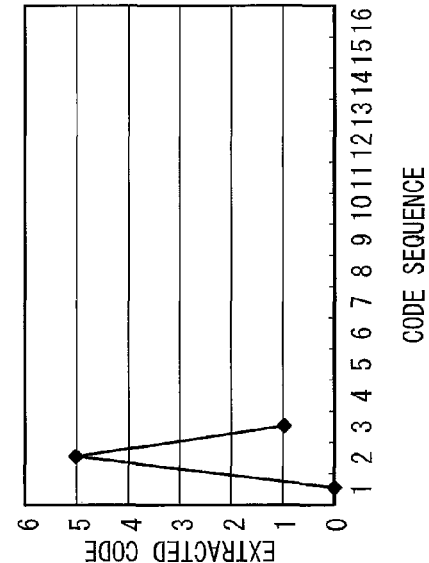
In FIG. 10, (a) is a diagram showing a concept of classifying flow rate differentials when using a gas appliance E in accordance with a flow rate classification table in Embodiment 4 of the invention, (b) is a graph showing flow rate characteristics when using the gas appliance E, (c) is a graph showing codes classified when using the gas appliance E, and (d) is a graph showing a code sequence with characteristics extracted when using the gas appliance E.
Figure 10:
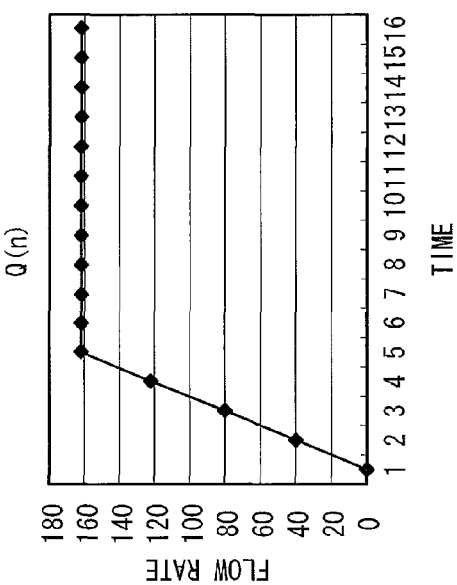
Figure 10:
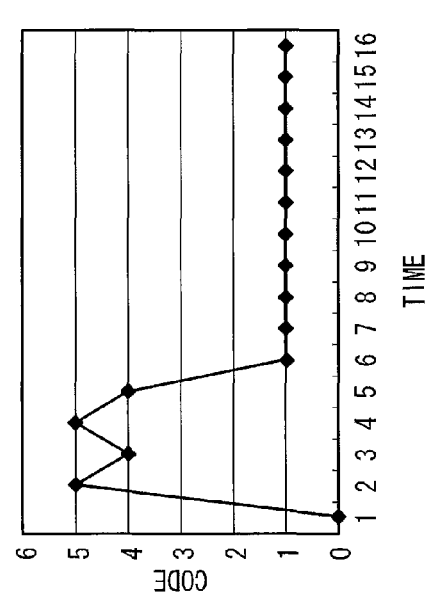

FIGS. 10(a) to 10(d) are diagrams showing a concept of characteristic extraction in Embodiment 4 of the invention. In a gas appliance E having the rise characteristic of the flow rate shown in FIG. 10(b), a code sequence at regular time intervals converted by the differential conversion unit 112 becomes [0545411111111111] as shown in FIG. 10(a). This is shown in the graph of FIG. 10(c). At this time, as shown in the example of FIG. 10(a), if the flow rate differential changes in the vicinity of the threshold value as when the flow rate differential changes repeatedly between 41 L/h and 40 L/h, the difference between 41 L/h and 40 L/h is only 1 L/h; however, although the difference is small, the code changes like [5454].

The code sequence in the zone of the rise in the flow rate is [05454], and has an M-shaped characteristic as shown in FIG. 10(c). That is, although there is generally a rightward rise in the flow rate characteristic, the code sequence has an M shape, and thus it may not be said that there is coincidence in the characteristic.

Accordingly, in addition to the characteristic extraction process described in Embodiment 1, Embodiment 2, or Embodiment 3, when the change in the codes obtained by the differential conversion unit 112 has an M shape, that is, when the third last code is greater than the fourth last code, the second last code is smaller than the third last code, the last code is greater than the second last code, and the current code is smaller than the last code, if the differential between the last code and the second last code is equal to or smaller than a predetermined value, and the second last code and the current code are the same, the appliance characteristic extraction unit 214 performs a process for deleting the last code and the second last code and overwriting the current code on the second last code. It is assumed that the differential between the last code and the second last code when the change in the codes has an M shape and the last code and the second last code are deleted is equal to or smaller than 1.

With this process, among the codes converted by the differential conversion unit 112, a code sequence [05454] upon the rise becomes [054], and [05411111111111] obtained by adding subsequent codes is subjected to the process described in Embodiment 1. As a result, the code sequence becomes [051] and stored in the appliance characteristic code sequence.

Next, FIGS. 11(a) to 11(d) are diagrams showing a concept of characteristic extraction in Embodiment 4 of the invention. The differences from FIGS. 10(a) to 10(d) will be described below.

Figure 11:
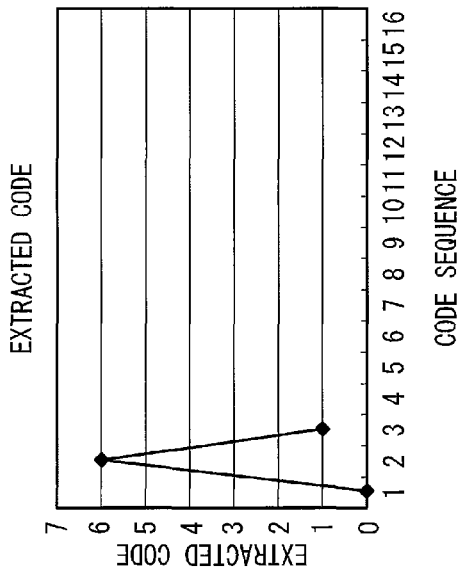
In FIG. 11, (a) is a diagram showing a concept of classifying flow rate differentials when using a gas appliance F in accordance with a flow rate classification table in Embodiment 4 of the invention, (b) is a graph showing flow rate characteristics when using the gas appliance F, (c) is a graph showing codes classified when using the gas appliance F, and (d) is a graph showing a code sequence with characteristics extracted when using the gas appliance F.
Figure 11:
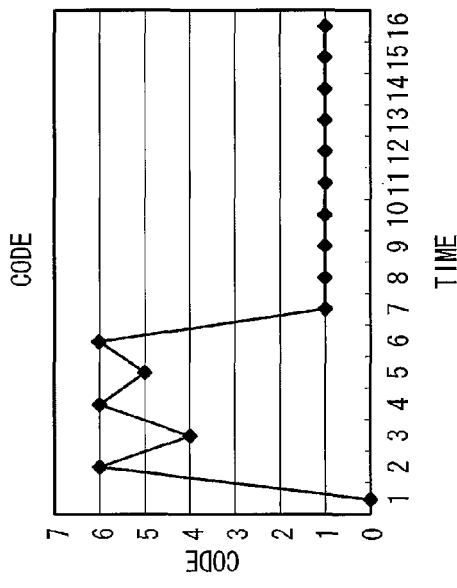
Figure 12:
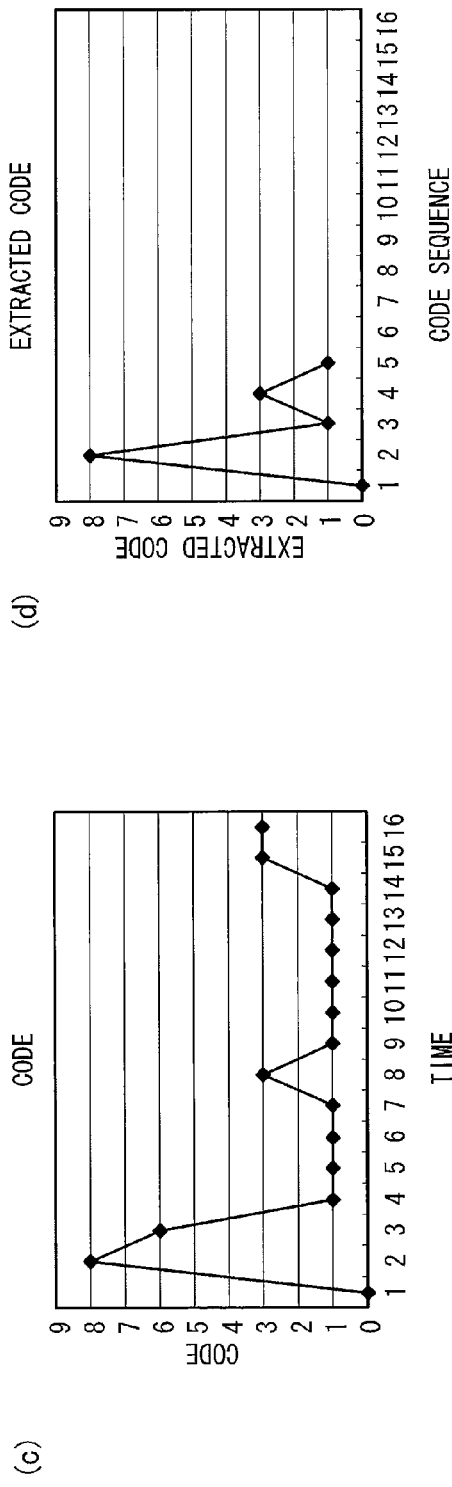
In FIG. 12, (a) is a diagram showing a concept of classifying flow rate differentials when using a gas appliance C in accordance with a flow rate classification table in Embodiment 5 of the invention, (b) is a graph showing flow rate characteristics when using the gas appliance C, (c) is a graph showing codes classified when using the gas appliance C, and (d) is a graph showing a code sequence with characteristics extracted when using the gas appliance C.
Figure 12:
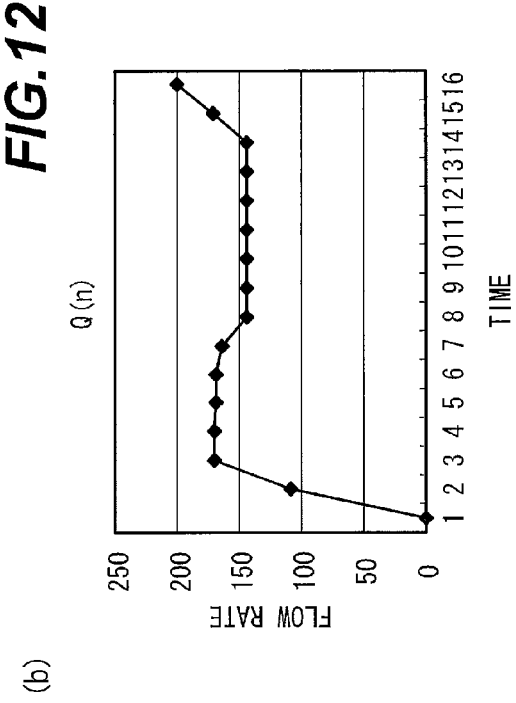
Figure 12:
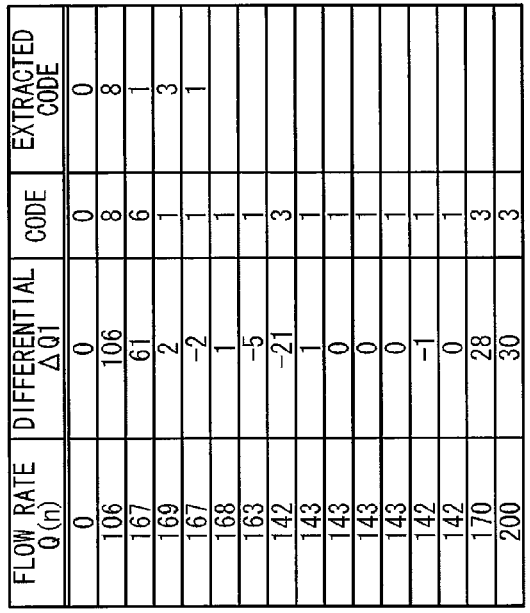
Figure 13:
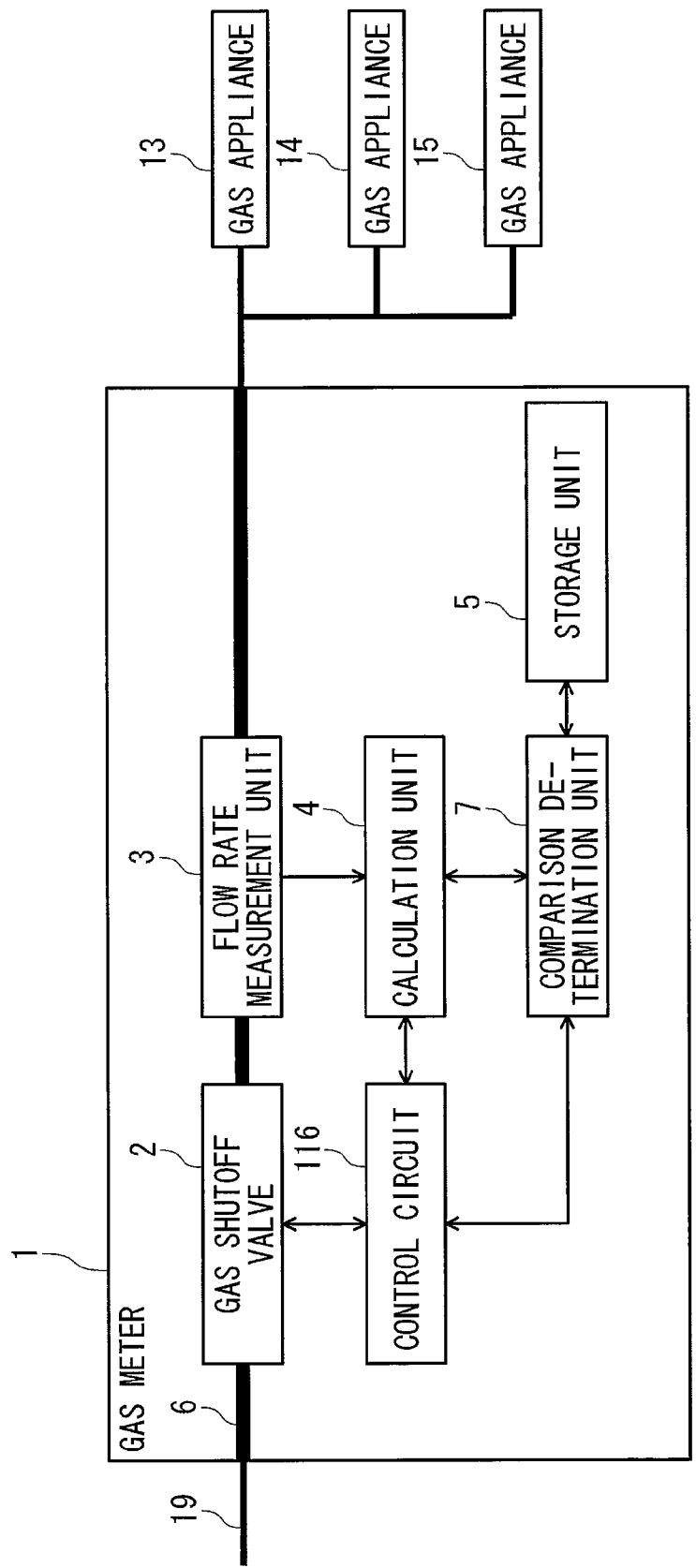
FIG. 13 is a block diagram of a gas meter of the related art.
Figure 14:
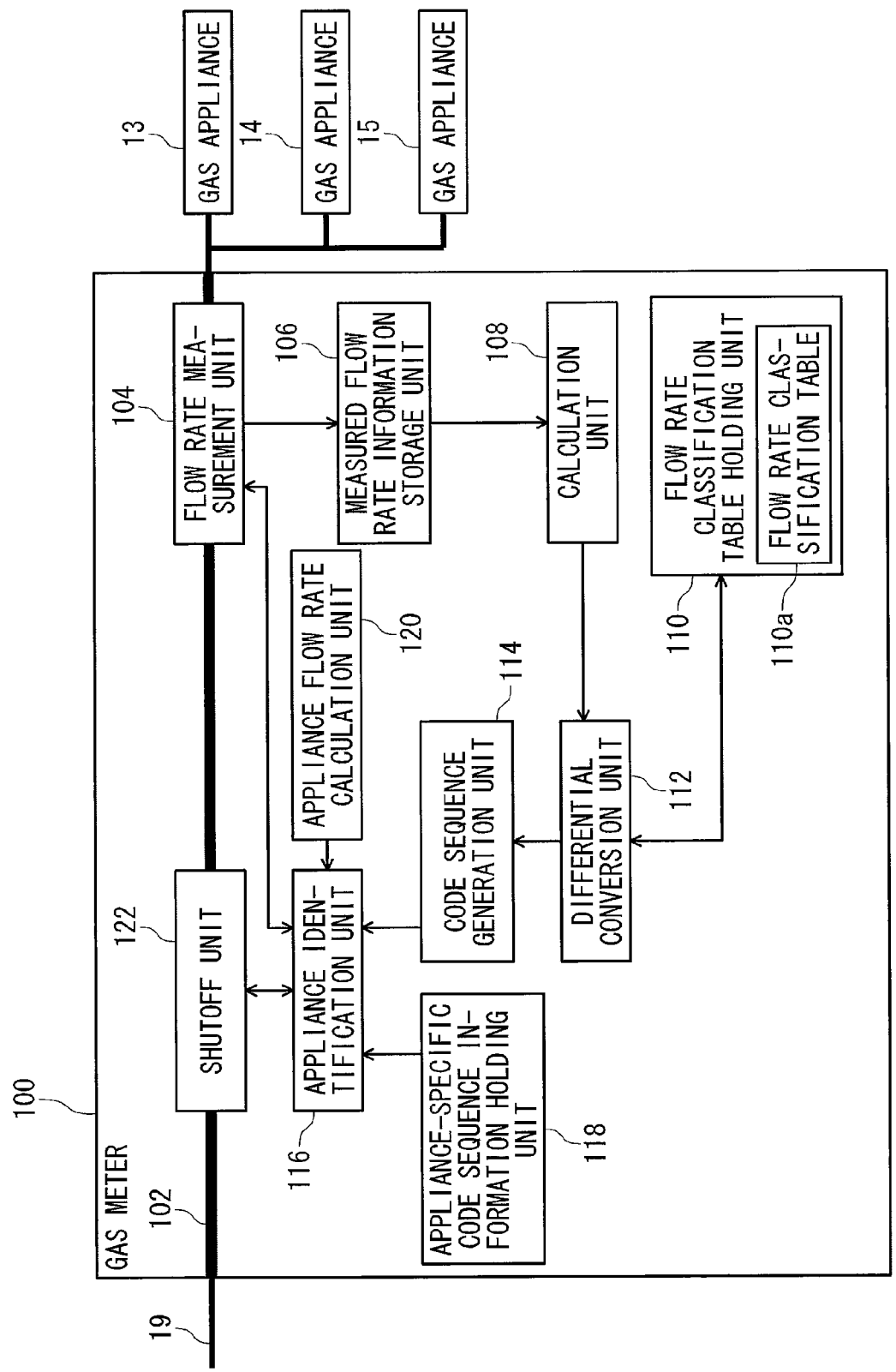
FIG. 14 is a block diagram of a flow rate measurement device of the related art.

In a gas appliance F having the rise characteristic of the flow rate shown in FIG. 11(b), a code sequence at regular time intervals converted by the differential conversion unit 112 becomes [0646561111111111] as shown in FIG. 11(a). This is shown in the graph of FIG. 11(c). At this time, although a code sequence [06465] upon the rise in the flow rate has an M shape as shown in the example of FIG. 10(c), the differential between the last code and the second last code is 2, and the M-shaped code compression condition is not satisfied, such that the codes remains without being compressed. However, a code sequence [64656] obtained by deleting the head code and adding the next code has a W-shaped characteristic as shown in FIG. 11(c).

Accordingly, in addition to the characteristic extraction process described in Embodiment 1, Embodiment 2, or Embodiment 3, when the change in the codes obtained by the differential conversion unit 112 has a W shape, that is, when the third last code is smaller than the fourth last code, the second last code is greater than the third last code, the last code is smaller than the second last code, and the current code is greater than the last code, if the differential between the last code and the second last code is equal to or smaller than a predetermined value, and the second last code and the current code are the same, the appliance characteristic extraction unit 214 performs a process for deleting the last code and the second last code stored in the appliance characteristic code sequence and overwriting the current code on the second last code stored in the appliance characteristic code sequence. It is assumed that the differential between the last code and the second last code when the change in the codes has a W shape and the last code and the second last code are deleted is equal to or smaller than 1.

With this process, among the codes converted by the differential conversion unit 112, a code sequence [64656] upon the rise becomes [646]. [6461] of [06461111111111] obtained by adding the head code and subsequent codes corresponding to the inverted N shape described in Embodiment 3. For this reason, the code sequence is subjected to the process described in Embodiment 1, such that the code sequence becomes [061] and stored in the appliance characteristic code sequence.

With the M-shaped or the W-shaped process, the M shape or the W shape of the code sequence is absorbed, thereby clearly extracting the characteristic of the intrinsic flow rate characteristic.

As described above, in this embodiment, the appliance characteristics, in which the inclination tendency of the flow rate characteristic is reflected, are extracted by the appliance characteristic extraction unit 214 from the code sequence at regular time intervals converted by the differential conversion unit 112 on the basis of the differentials of the first calculation unit 108 or the second calculation unit 230. Therefore, it becomes possible to perform appliance identification with high precision, and to compress the code sequence by characteristic extraction, thereby reducing the memory size.

Embodiment 5

FIGS. 12(a) to 12(d) are diagrams showing a concept of characteristic extraction in Embodiment 5 of the invention. Although the gas appliance C described in Embodiment 1 is ignited, and then heating power is switched is described, it is assumed that the change in the flow rate upon the rise until heating power is changed is the same as shown in FIGS. 7(a) to 7(d). FIG. 11(b) shows the rise characteristics of the flow rate including the change in heating power after ignition, and the code sequence at regular time intervals converted by the differential conversion unit 112 becomes [0861111311111133] as shown in FIG. 11(a). This is shown in the graph of FIG. 11(c).

As described in Embodiment 1, while the code sequence [08611113111111] until heating power is changed becomes [08131] by a characteristic extraction process, if heating power change codes are included, the code sequence becomes [0813133], and finally becomes [081313] by the process in Embodiment 1. Since this code sequence is different from the extracted code sequence [08131] of FIG. 7(a) in Embodiment 1, it may not be determined to be the same gas appliance.

Accordingly, when the absolute value of the final code of the appliance characteristic code sequence is equal to or greater than a predetermined value, the appliance characteristic extraction unit 214 performs a process for deleting the final code from the appliance characteristic code sequence. It is assumed that the predetermined value which is used to delete the final code is equal to or greater than 2.

Figure 7:
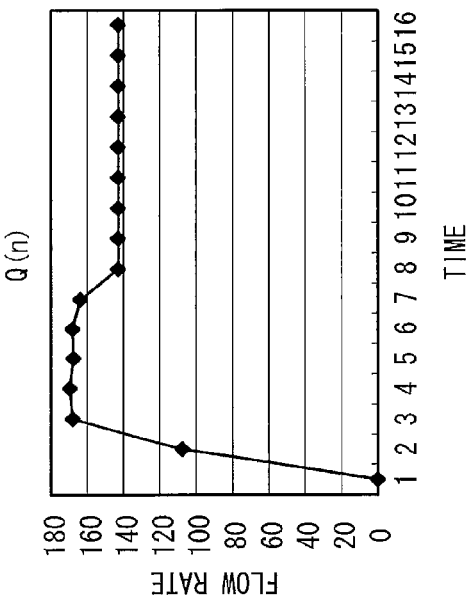
In FIG. 7, (a) is a diagram showing a concept of classifying flow rate differentials when using a gas appliance C in accordance with a flow rate classification table in Embodiment 1 of the invention, (b) is a graph showing flow rate characteristics when using the gas appliance C, (c) is a graph showing codes classified when using the gas appliance C, and (d) is a graph showing a code sequence with characteristics extracted when using the gas appliance C.
Figure 7:
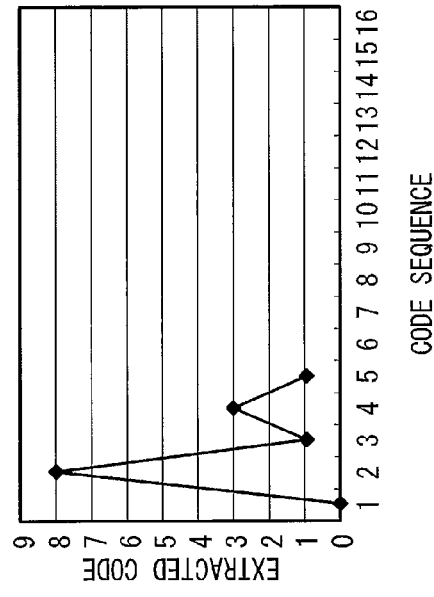
Figure 7:
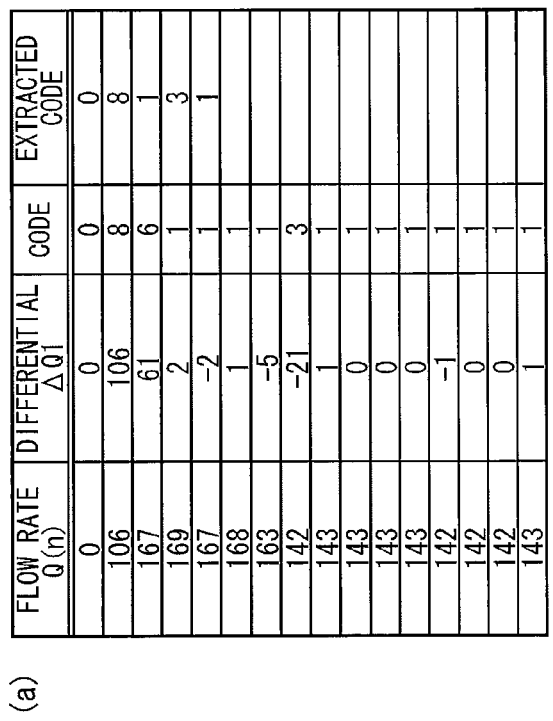
Figure 7:
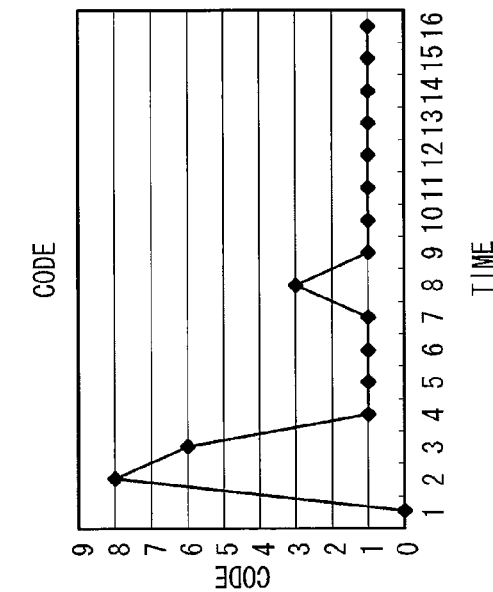

With this process, the above-described code sequence [081313] becomes [08131], and the same code sequence as the case of FIG. 7(a) where heating power is not changed, thereby determining to be the same gas appliance.

As described above, in this embodiment, it becomes possible to exclude codes, which appear when artificial switching of the amount of combustion is performed, from the appliance characteristic code sequence, to identify the appliances with high precision, and to compress a code sequence by characteristic extraction, thereby reducing the memory size.

In order to execute the appliance characteristic extraction method or the appliance determination method described above, a program for executing the respective steps is stored in the appliance identification unit 116 of the gas meter 100, or a computer (not shown) (calculation device). Meanwhile, hardware, instead of the program, may also be used for the execution.

Although in the foregoing embodiments, a case where an ultrasonic flowmeter is used as the flow rate measurement unit has been described, even in another type of instantaneous flow rate measurement device which uses a sampling signal, it is obvious that the same effects are obtained. Although description of process after appliance identification is omitted, it is obvious in the gas meter that an appliance specific charge based on the measurement of the integrated flow rate for each registered appliance or each classified group may be set, and that an appliance specific security function for safety control (security function) for each registered appliance or each classified group may be set. If a transmitting and receiving unit, such as a wireless device, may be mounted in a gas meter and a gas appliance, it is obvious that the precision of appliance identification is improved.

Although in the foregoing embodiments, the appliance characteristic extraction using codes converted from flow rate differentials at regular time intervals has been described, more accurate characteristic extraction may be performed using the flow rate differentials.

Although in the foregoing embodiments, the appliance-specific characteristic code sequence stored in the appliance-specific code sequence information holding unit 118 is compared with the appliance characteristic code sequence representing the characteristics of the appliances from the codes obtained by the differential conversion unit to identify the appliances, with regards to the appliance-specific characteristic code sequence, actual flow rate measurement may be repeated, and correction may be made taking into consideration variations. An appliance registration mode may be provided, an appliance may be repeatedly operated on site, the appliance characteristic may be extracted and averaged, and the characteristic may be registered as an appliance-specific characteristic code sequence. An appliance-specific characteristic code sequence may be registered automatically by learning without setting an appliance-specific characteristic code sequence in advance.

Although various embodiments of the invention have been described, the invention is not limited to the embodiments, and the invention will also be subjected to various alterations or applications by those skilled in the art on the basis of the description of the specification and the well-known techniques without departing the spirit and scope of the invention. The alterations or modifications shall also fall within the range where protection of the present invention is sought.

Although the invention has been described in detail or in connection with specific examples, it is obvious to those skilled in the art that various changes or modifications may be made without departing from the spirit and scope of the invention.

This application is based on Japanese Patent Application No. 2009-252605 filed on Nov. 4, 2009, the content of which is incorporated herein by reference.

INDUSTRIAL APPLICABILITY

As described above, the flow rate measurement device according to the invention can extract characteristics of appliances, and can be thus applied for specifying a used appliance connected to the downstream side of the flow rate measurement device or grouping even in an industrial flowmeter or a water meter.

The invention claimed is:

1. A flow rate measurement device, comprising:
a flow rate measurement unit that is configured to measure a flow rate of a fluid flowing in a flow channel at a regular time interval;
a first calculation unit that is configured to calculate differentials at regular time intervals in the flow rates measured by the flow rate measurement unit;
a second calculation unit that is configured to calculate differentials at time intervals different from those in the first calculation unit;
a flow rate classification table in which a plurality of differential classifications classified according to a magnitude of the differentials are associated with codes representing the respective classifications;
a differential conversion unit that is configured to convert the differentials calculated by the first calculation unit and the second calculation unit into first code sequences based on the flow rate classification table;
an appliance characteristic extraction unit that is configured to generate second code sequences representing characteristics of an appliance from the first code sequences, wherein the second code sequences are compressed information represented by the first code sequences, the appliance characteristic extraction unit further configured to extract a plurality of appliance characteristic flow rates representing characteristics of the appliance from the flow rate measured by the flow rate measurement unit;

an appliance-specific characteristic information holding unit that stores appliance-specific characteristic code sequences specific to the appliances and a plurality of appliance-specific characteristic flow rates specific to the appliances;

an appliance identification unit that is configured to compare at least either the second code sequences with the appliance-specific characteristic code sequences specific to the appliances and the plurality of appliance characteristic flow rates with the plurality of appliance-specific characteristic flow rates specific to the appliances and identifies an appliance based on a comparison between the second code sequences and the appliance-specific characteristic code sequences, a comparison between the appliance characteristic flow rates and the appliance-specific characteristic flow rates, or both.

2. The flow rate measurement device according to claim 1, wherein the appliance characteristic extraction unit adds a minus sign to a code when a differential calculated by the first calculation unit or the second calculation unit is negative and the code obtained by the differential conversion unit is other than a predetermined code, and does not overwrite a current code on a last code stored in the second code sequences when the last code is positive and the current code is negative.

3. The flow rate measurement device according to claim 1, wherein when the change in the codes obtained by the differential conversion unit has an N shape, that is, when a second last code is greater than a third last code, a last code is smaller than the second last code, and a current code is greater than the last code, if the differential between the last code and the second last code is equal to or smaller than a predetermined value, and the second last code is smaller than the current code, or when the change in the codes obtained by the differential conversion unit has an inverted N shape, that is, when the second last code is smaller than the third last code, the last code is greater than the second last code, and the current code is smaller than the last code, if the differential between the last code and the second last code is equal to or smaller than a predetermined value, and the second last code is greater than the current code, the appliance characteristic extraction unit deletes the last code and the second last code stored in the second code sequences, and overwrites the current code on the second last code stored in the second code sequences.

4. The flow rate measurement device according to claim 1, wherein when the change in the codes obtained by the differential conversion unit has an M shape, that is, when a third last code is greater than a fourth last code, a second last code is smaller than the third last code, a last code is greater than the second last code, and a current code is smaller than the last code, if the differential between the last code and the second last code is equal to or smaller than a predetermined value, and the second last code and the current code are the same, or when the change in the codes obtained by the differential conversion unit has a W shape, that is, when the third last code is smaller than the fourth last code, the second last code is greater than the third last code, the last code is smaller than the second last code, and the current code is greater than the last code, if the differential between the last code and the second last code is equal to or smaller than a predetermined value, and the second last code and the current code are the same, the appliance characteristic extraction unit deletes the last code and the second last code stored in the second code sequences, and overwrites the current code on the second last code stored in the second code sequences.

5. The flow rate measurement device according to claim 1, wherein
when an absolute value of a final code of the second code sequences is equal to or greater than a predetermined value, the appliance characteristic extraction unit deletes the final code from the second code sequences.

6. A non-transitory computer-readable storage medium for storing a program which causes a computer to function as a whole or a part of the flow rate measurement device as set forth in claim 1.

* * * * *